United States Patent
Tsai

(10) Patent No.: US 12,174,489 B2
(45) Date of Patent: Dec. 24, 2024

(54) OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

(71) Applicant: KEIWA Incorporated, Tokyo (JP)

(72) Inventor: Chengheng Tsai, Tokyo (JP)

(73) Assignee: KEIWA INCORPORATED, Tokyo (JP)

( * ) Notice: Subject to any disclaimer, the term of this patent is extended or adjusted under 35 U.S.C. 154(b) by 0 days.

(21) Appl. No.: 18/593,773

(22) Filed: Mar. 1, 2024

(65) Prior Publication Data
US 2024/0201539 A1    Jun. 20, 2024

Related U.S. Application Data

(63) Continuation of application No. PCT/JP2022/019123, filed on Apr. 27, 2022.

(30) Foreign Application Priority Data

Sep. 9, 2021    (JP) ................................. 2021-146804

(51) Int. Cl.
G02F 1/13357    (2006.01)
G02B 5/02    (2006.01)
(Continued)

(52) U.S. Cl.
CPC ..... *G02F 1/133606* (2013.01); *G02B 5/0278* (2013.01); *G02B 5/045* (2013.01); *G02F 1/133607* (2021.01)

(58) Field of Classification Search
CPC ......... G02F 1/133606; G02F 1/133607; G02F 1/133611; G02B 5/045; G02B 5/0278; G02B 6/0051; G02B 6/0053
See application file for complete search history.

(56) References Cited

U.S. PATENT DOCUMENTS 5,808,784 A    9/1998    Ando et al.
5,841,572 A    11/1998    Ando et al.
(Continued)

FOREIGN PATENT DOCUMENTS

JP    H08-338901 A    12/1996
JP    2011-129277 A    6/2011
(Continued)

OTHER PUBLICATIONS

International Search Report and Written Opinion for International Application No. PCT/JP2022/019123 (ISA/JP) mailed Jul. 12, 2022 w/English translation (9 pages).

*Primary Examiner* — Erin Kryukova
(74) *Attorney, Agent, or Firm* — Alston & Bird LLP

(57) ABSTRACT

An optical sheet laminate 100 is incorporated into a backlight unit 40. The optical sheet laminate 100 includes a plurality of diffusion sheets 43 having a first surface 21a having a plurality of recesses 22 having a substantially inverted quadrangular pyramid shape and arranged in a two-dimensional matrix, and a pair of prism sheets 44 and 45 having prism extending directions perpendicular to each other. The plurality of diffusion sheets 43 include at least two diffusion sheets 43 where an arrangement direction of the recesses 22 of one of the at least two diffusion sheets 43 is different from that of the recesses of another one of the at least two diffusion sheets 43.

10 Claims, 7 Drawing Sheets

(51) Int. Cl.
     *G02B 5/04*           (2006.01)
     *G02F 1/1335*       (2006.01)

(56) References Cited

U.S. PATENT DOCUMENTS

| | | | |
|---|---|---|---|
| 11,333,924 B1* | 5/2022 | Lv | G02F 1/133612 |
| 2007/0091616 A1* | 4/2007 | Cassarly | G02B 5/045 |
| | | | 362/341 |
| 2012/0236556 A1* | 9/2012 | Yamaguchi | G02B 5/0231 |
| | | | 362/235 |
| 2014/0362579 A1 | 12/2014 | Noh et al. | |
| 2020/0341335 A1 | 10/2020 | Tsai et al. | |
| 2021/0072598 A1* | 3/2021 | Walker | G02F 1/133603 |
| 2022/0004058 A1 | 1/2022 | Tsai et al. | |
| 2022/0326571 A1 | 10/2022 | Tsai et al. | |

FOREIGN PATENT DOCUMENTS

| | | |
|---|---|---|
| JP | 2018-194814 A | 12/2018 |
| JP | 2020-86432 A | 6/2020 |
| KR | 101430916 B1 * | 8/2014 |
| TW | 2020-30534 A | 8/2020 |

\* cited by examiner

OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

CROSS REFERENCE TO RELATED APPLICATIONS

This application is a bypass continuation of International Application No. PCT/JP2022/019123, filed Apr. 27, 2022, which international application claims priority to and the benefit of Japanese Application No. 2021-146804, filed Sep. 9, 2021: the contents of both of which are hereby incorporated by reference herein in their respective entireties.

BACKGROUND

The present disclosure relates to an optical sheet laminate, a backlight unit, a liquid crystal display device, an information apparatus, and a method for manufacturing the backlight unit.

In recent years, liquid crystal display devices (hereinafter referred to as liquid crystal displays in some cases) have been widely used as display devices for various information apparatuses such as smartphones and tablet terminals. A major type of a backlight of a liquid crystal display is a direct type in which light sources are arranged on the back surface of the liquid crystal panel, because of the requirement for high luminance and high contrast.

When the direct-type backlight is adopted, an optical sheet such as a diffusion sheet or a prism sheet is used to diffuse light emitted from a light source such as a light emitting diode (LED) to improve uniformity of luminance and chromaticity over the entire screen (e.g., see Patent Document 1: Japanese Unexamined Patent Publication No. 2011-129277).

A direct-type backlight unit of a liquid crystal display such as a laptop computer or a tablet computer, where the distance between light sources and a diffusion sheet is made short to meet the requirement for reduction in the thickness, causes insufficient diffusion of light from the light sources, which leads to uneven uniformity of luminance and chromaticity. Thus, a plurality of diffusion sheets are layered to improve the uniformity of luminance and the like.

SUMMARY

Portable information equipment such as a laptop computer, a tablet computer and the like, which are carried around and used, requires still lower power consumption. Accordingly, an optical sheet incorporated in a backlight unit is required to achieve a high-luminance screen with low power.

However, a conventional backlight unit with the entire luminance improved tends to have a lower luminance uniformity:

It is an object of the present disclosure to provide a backlight unit with less decrease in the luminance uniformity.

To achieve the object, an optical sheet laminate to be incorporated into a backlight unit includes a plurality of diffusion sheets each having surfaces, at least one of which has a plurality of recesses having a substantially inverted quadrangular pyramid shape and arranged in a two-dimensional matrix: and a pair of prism sheets having prism extending directions perpendicular to each other. The plurality of diffusion sheets include at least two diffusion sheets where an arrangement direction of the plurality of recesses of one of the at least two diffusion sheets is different from that of the plurality of recesses of another one of the at least two diffusion sheets.

The optical sheet laminate of the present disclosure uses the plurality of diffusion sheets (hereinafter referred to as pyramid sheets in some cases) each including a surface having a plurality of recesses having a substantially inverted quadrangular pyramid shape, such that light having traveled straight from the light sources 42 are repeatedly diffused. Thus, the luminance uniformity can be improved. Further, the at least two diffusion sheets where the arrangement direction of the recesses of one of the at least two diffusion sheets is different from that of another one of the at least two diffusion sheets enables further improvement in the luminance uniformity:

To further improve the luminance uniformity, it is preferable that the optical sheet laminate of the present disclosure includes the plurality of diffusion sheets including a first diffusion sheet and a second diffusion sheet, where the arrangement direction of the recesses of the second diffusion sheet is different by 10° or more from the arrangement direction of the recesses of the first diffusion sheet. In this case, it is further preferable that the plurality of diffusion sheets further include a third diffusion sheet, where the arrangement direction of the recesses of the third diffusion sheet is different by 10° or more from the arrangement direction of the recesses of each of the first diffusion sheet and the second diffusion sheet.

In the optical sheet laminate of the present disclosure, the arrangement direction of the recesses of at least one of the plurality of diffusion sheets may be different by 20° or more and 70° or less from the prism extending direction. Accordingly, with the same light sources, the same electric power, and the same optical sheet laminate configuration, the luminance more increases than when the angle difference between the arrangement direction of the recesses (inverted quadrangular pyramids) and the prism extending direction is near 0° or near 90°. Thus, the backlight unit with even low power can provide a high-luminance screen. In this case, still higher luminance can be achieved when the intersecting angle between the arrangement direction of the recesses and the prism extending direction is 25° or more and 35° or less, or 55° or more and 65° or less.

A backlight unit of the present disclosure to be built in a liquid crystal display device and leading light emitted from light sources toward a display screen includes the optical sheet laminate of the present disclosure between the display screen and the light sources. The plurality of diffusion sheets are arranged between the light sources and the pair of prism sheets.

The backlight unit of the present disclosure includes the optical sheet laminate of the present disclosure, and this enables less decrease in the luminance uniformity:

In the backlight unit of the present disclosure, the light sources may be arranged on a reflection sheet provided on an opposite side of the display screen when viewed from the plurality of diffusion sheets. This causes multiple reflections between the diffusion sheets and the reflection sheet thus causing further light diffusion, and thus the luminance uniformity is further improved.

In the backlight unit of the present disclosure, the distance between the light sources and the plurality of diffusion sheets may be 5 mm or less, preferably 2.5 mm or less, and more preferably 1 mm or less. This contributes to reduction in the thickness of the backlight unit.

A liquid crystal display device of the present disclosure includes the backlight unit of the present disclosure and a liquid crystal display panel.

The liquid crystal display device of the present disclosure includes the backlight unit of the present disclosure, and this enables less decrease in the luminance uniformity.

An information apparatus of the present disclosure includes the liquid crystal display device of the present disclosure.

The information apparatus of the present disclosure includes the liquid crystal display device of the present disclosure, and this enables less decrease in the luminance uniformity.

A method of the present disclosure for manufacturing a backlight unit is a method for manufacturing a backlight unit to be built in a liquid crystal display device and leading light emitted from light sources toward a display screen. The method of the present disclosure for manufacturing a backlight unit includes arranging a plurality of diffusion sheets between the light sources and the display screen, where the diffusion sheets each have surfaces, at least one of which has a plurality of recesses having a substantially inverted quadrangular pyramid shape and arranged in a two-dimensional matrix: and arranging a pair of prism sheets between the plurality of diffusion sheets and the display screen, where the pair of prism sheets have prism extending directions perpendicular to each other. In arranging the plurality of diffusion sheets, the luminance uniformity is evaluated with various arrangement directions of the plurality of recesses of each of the plurality of diffusion sheets, and based on an evaluation result, the arrangement direction of the plurality of recesses of each of the plurality of diffusion sheets is determined.

The method of the present disclosure for manufacturing a backlight unit includes arranging the plurality of diffusion sheets, where the luminance uniformity is evaluated with various arrangement directions of the recesses of each of the diffusion sheets, and based on an evaluation result, the arrangement direction of the recesses of each of the diffusion sheets is determined. Thus, the arrangement direction of the recesses of each of the diffusion sheets can be set to improve the luminance uniformity.

The present disclosure provides a backlight unit with less decrease in the luminance uniformity.

DETAILED DESCRIPTION

Embodiment

An optical sheet laminate, a backlight unit, a liquid crystal display device, an information apparatus, and a method for manufacturing the backlight unit of an embodiment will be described below with reference to the drawings. Note that the scope of the present disclosure is not limited to the following embodiments, and may be altered in any way within the scope of the technical concept of the present disclosure.

<Configuration of Liquid Crystal Display Device>

Figure 1:
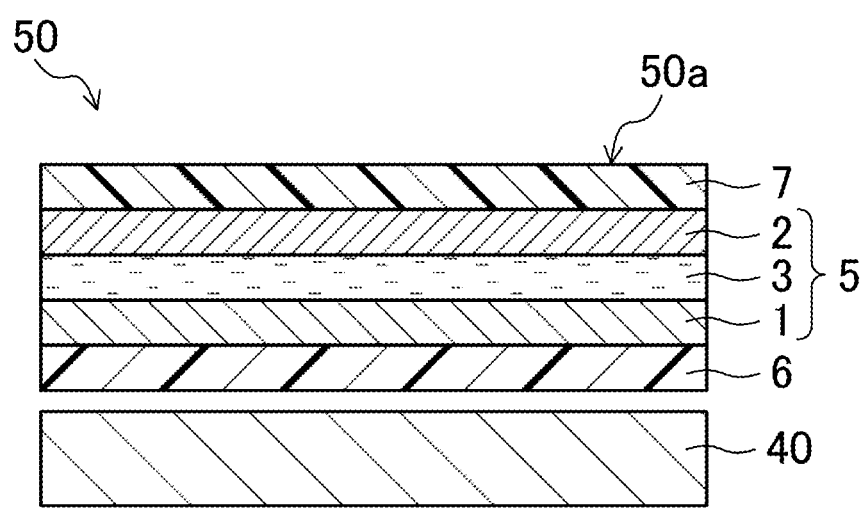
FIG. 1 is a cross-sectional view of a liquid crystal display device including a backlight unit of an embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 sandwiched therebetween.

The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50a of the liquid crystal display device 50 viewed from the front (the top in FIG. 1) is basically a rectangle or a square. Alternatively, the shape may be any shape such as a rectangle with rounded corners, an oval, a circle, a trapezoid, or the shape of an instrument panel of an automobile.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image on the display screen 50a.

The liquid crystal display device 50 of this embodiment is applicable as a display apparatus built in various information apparatuses (e.g., in-vehicle devices such as car navigation systems: personal computers: mobile phones: portable information equipment such as laptops and tablet computers: portable game machines: copying machines: ticket vending machine: automated teller machines: and the like).

The TFT substrate 1 includes, e.g., a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, e.g., a black matrix arranged in a lattice manner on a glass substrate, a color filter including a red layer, a green layer, and a blue layer arranged between each lattice of the black matrix, a common electrode arranged in such a manner as to cover the black matrix and the color filter, and an alignment film arranged in such a manner as to cover the common electrode. The liquid crystal layer 3 is made of, e.g., a nematic liquid crystal material containing liquid crystal molecules having electro-optical characteristics. The first polarizing plate 6 and the second polarizing plate 7 each includes, e.g., a polarizer layer having a polarization axis in one direction, and a pair of protective layers arranged in such a manner as to sandwich the polarizer layer.

<Configurations of Backlight Unit and Optical Sheet Laminate>

Figure 2:
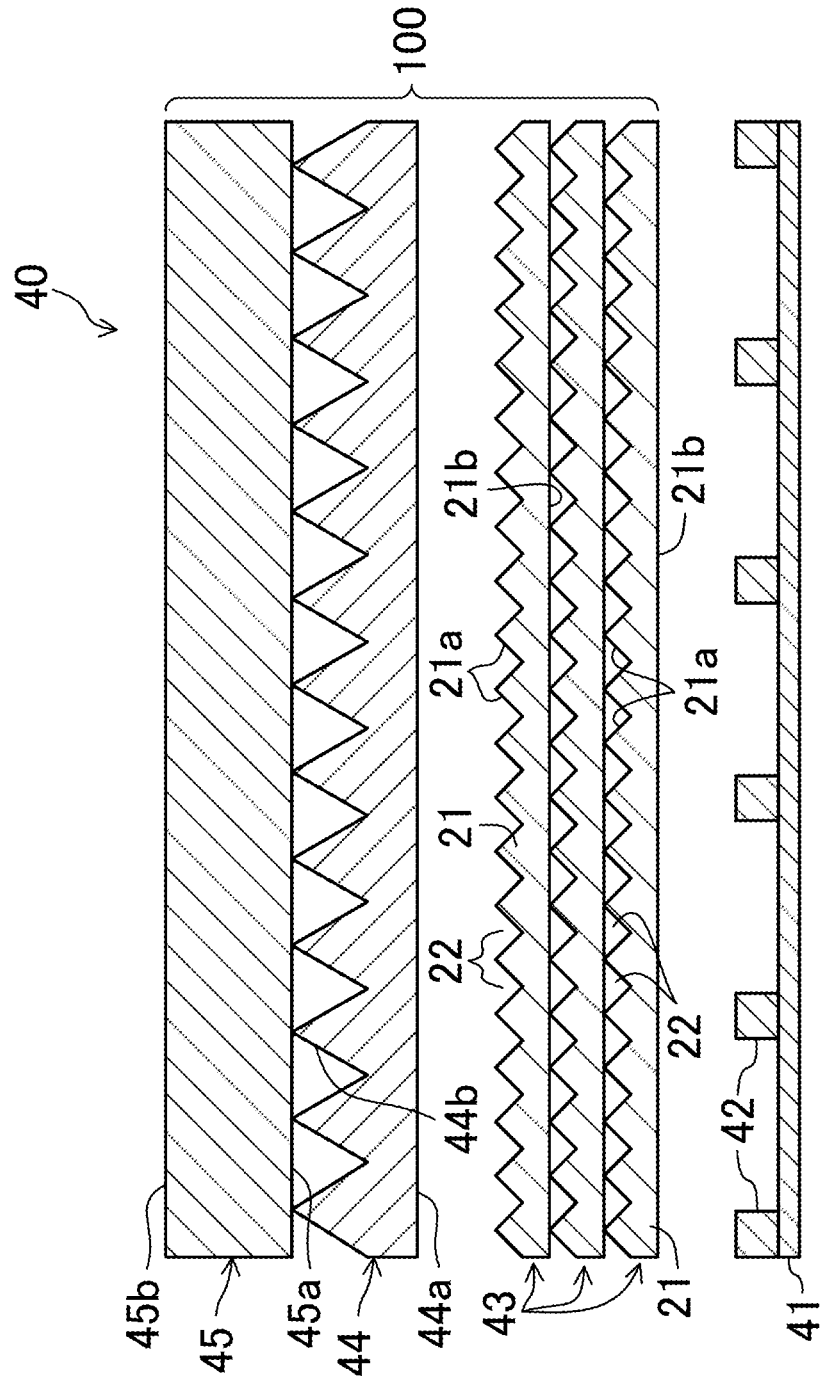
FIG. 2 is a cross-sectional view of a backlight unit containing an optical sheet laminate of the embodiment.

As shown in FIG. 2, the backlight unit 40 includes a reflection sheet 41, a plurality of light sources 42 two-dimensionally arranged on the reflection sheet 41, and an optical sheet laminate 100 provided above the plurality of light sources 42. The optical sheet laminate 100 includes a plurality of diffusion sheets 43 arranged above the light sources 42, and a pair of prism sheets 44 and 45 provided above the plurality of diffusion sheets 43 (i.e., provided closer to the display screen 50a).

In this embodiment, the light sources 42 may be, e.g., white light sources. Alternatively, the light sources 42 may be, e.g., blue light sources. In this case, a color conversion sheet may be provided between the plurality of diffusion sheets 43 and the prism sheets 44 and 45. The plurality of diffusion sheets 43 may include, e.g., three diffusion sheets 43 in a layered manner, each having surfaces, one of which has a plurality of recesses 22 having a substantially inverted quadrangular pyramid shape. Alternatively, the plurality of diffusion sheets 43 may include two or four or more diffusion sheets 43 in a layered manner. The pair of prism sheets 44 and 45 may be a lower prism sheet 44 and an upper prism sheet 45 having prism extending directions (directions in which prism ridges extend) perpendicular to each other. The diffusion sheet 43, the prism sheets 44 and 45, and the like constituting the optical sheet laminate 100 may be in the form of a film or a plate. These optical sheets may be layered within a frame (not shown) of the backlight unit 40 by their own weight without using an adhesive.

[Reflection Sheet]

The reflection sheet 41 is formed of, e.g., a white polyethylene terephthalate resin film, a silver-deposited film, or the like.

[Light Source]

The type of the light sources 42 is not particularly limited. For example, an LED element, a laser element, or the like may be adopted, and an LED element may be adopted for the sake of costs, productivity, and the like. The light source 42 may have a rectangular shape in a plan view; where each side may be 100 μm or more (preferably 50 μm or more) and 1 mm or less. When an LED element is used as each of the light sources 42, a plurality of LED chips may be arranged on the reflection sheet 41 at regular intervals. To adjust a light emission angle of each LED element serving as each of the light sources 42, a lens may be attached to the LED element. The number of the light sources 42 is not limited, while preferably, to be distributed, the plurality of light sources 42 may be arranged regularly on the reflection sheet 41. The "arranged regularly" means arrangement with a certain regularity. For example, the light sources 42 may be arranged at equal intervals. When the light sources 42 are arranged at equal intervals, the distance between the centers of two adjacent light sources 42 may be 0.5 mm or more (preferably 2 mm or more) and 20 mm or less. When a white light source is used as each of the light sources 42, the white light source may be configured by an LED element having the peak wavelength in a blue region, an LED element having the peak wavelength in a green region, and an LED element having the peak wavelength in a red region, and may emit light of, e.g., 0.24<x<0.42 and 0.18<y<0.48 in the CIE1931 color coordinates. When a blue light source is used as each of the light sources 42, the blue light source may emit light of, e.g., x<0.24 and y<0.18 in the CIE1931 color coordinates.

[Diffusion Sheet]

Figure 3:
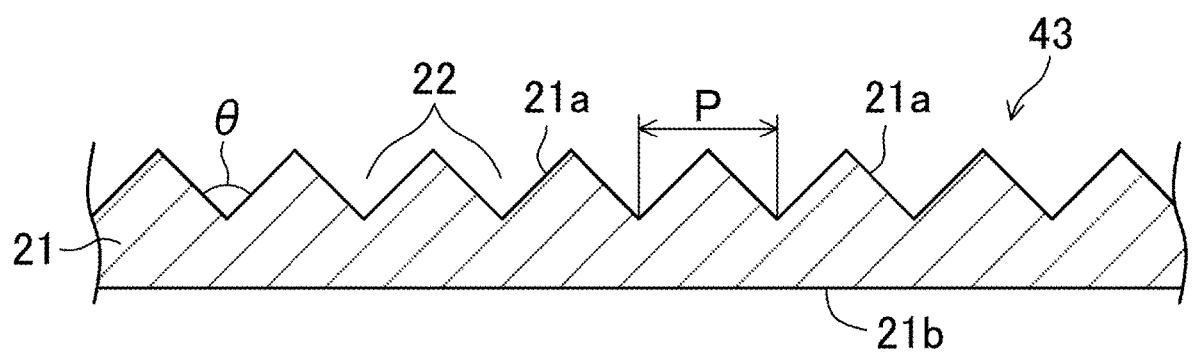
FIG. 3 is a cross-sectional view of a diffusion sheet in the optical sheet laminate of the embodiment.

The diffusion sheet 43 includes a base material layer 21 as shown in FIG. 2 and FIG. 3. The diffusion sheet 43 (base material layer 21) includes a first surface 21a as a light emitting surface and a second surface 21b as a light incident surface. That is, the diffusion sheet 43 is arranged so that the second surface 21b faces the light sources 42. The base material layer 21 is not particularly limited as long as it is formed of a resin material that transmits light, and may be, e.g., acrylic, polystyrene, polycarbonate, methyl methacrylate/styrene copolymer (MS) resin, polyethylene terephthalate, polyethylene naphthalate, cellulose acetate, polyimide, or the like. The base material layer 21 may contain a diffusing agent or other additives, or may be substantially free of additives. The additives that the base material layer 21 can contain are not particularly limited, but examples of the additives include silica, titanium oxide, aluminum hydroxide, and barium sulfate as inorganic particles, as well as acrylic, acrylonitrile, silicone, polystyrene, and polyamide as organic particles.

The thickness of the light diffusion sheet 43 is not limited, but may be, e.g., 0.1 mm or more and 3 mm or less (preferably 2 mm or less, more preferably 1.5 mm or less, and further more preferably 1 mm or less). The diffusion sheet 43 having a thickness of 3 mm or less contributes to reduction in the thickness of the liquid crystal display. The diffusion sheet 43 having a thickness of 0). 1 mm or more contributes to improvement in the luminance uniformity. The diffusion sheet 43 may be in the form of a film or a plate.

Figure 4:
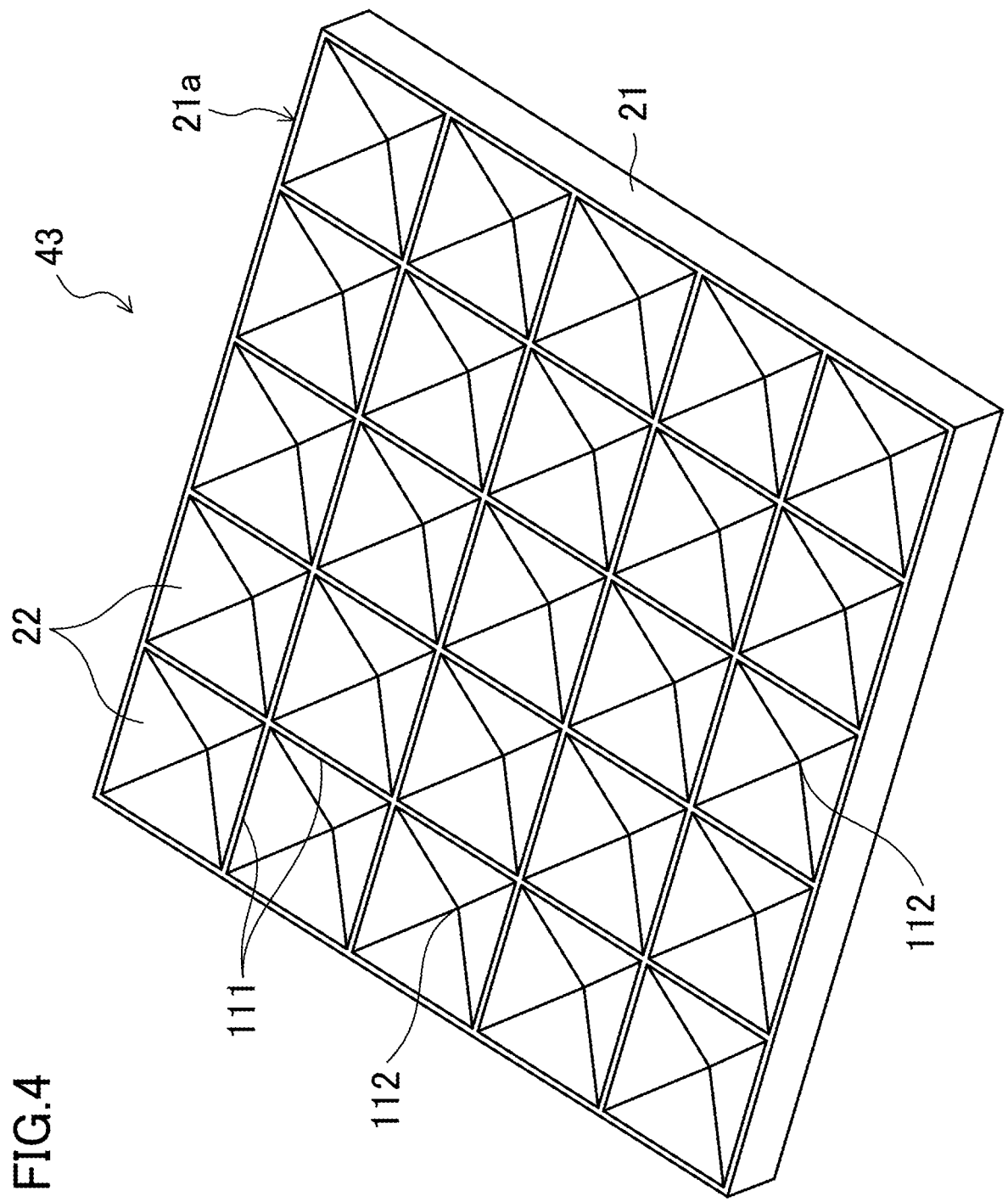
FIG. 4 is a perspective view of a diffusion sheet in the optical sheet laminate of the embodiment.

On the first surface 21a of the light diffusion sheet 43, a plurality of recesses 22 having a substantially inverted quadrangular pyramid shape (inverted pyramid shape) are arranged in a two-dimensional matrix as shown in FIG. 4. In other words, the plurality of recesses 22 are arranged along two directions perpendicular to each other. The recesses 22 adjacent to each other are parted by a ridge 111. The ridge 111 extends along the two directions in which the recesses 22 are arrayed. A center (apex of the inverted pyramid) 112 of the recess 22 is a deepest portion of the recess 22. Although FIG. 4 illustrates that the recesses 22 are arranged in a 5×5 matrix for simplicity, the actual number of the recesses 22 is much larger. In a two-dimensional array of the plurality of recesses 22, the recesses 22 may be arranged on the first surface 21a without a space therebetween, or may be arranged with a predetermined space therebetween. Some of the recesses 22 may be randomly arranged to the extent that the light diffusing effect is not lost.

The apex angle θ of the recess 22 may be, e.g., 90°. The recesses 22 may be arranged at an arrangement pitch p of, e.g., 100 μm. The depth of the recess 22 may be, e.g., 50 μm. The apex angle θ of the recess 22 is an angle formed by cross-sectional lines of a pair of inclined surfaces of the recess 22 which sandwich the center of the recess 22 and face each other, where the cross-sectional lines appear in a cross section when the recess 22 is cut by a surface (longitudinal cross-section) vertical to a surface (horizontal surface) on which the light diffusion sheet 43 is placed, such that the surface (longitudinal cross-section) passes through the center of the recess 22 (apex 112 of the inverted pyramid) and vertically traverses the pair of inclined surfaces of the recess 22. The arrangement pitch p of the recesses 22 means a distance between the centers of the recesses 22 (apexes of the inverted pyramids 112) adjacent to each other (i.e., distance in a direction parallel to the arrangement surface of the diffusion sheet 43).

The second surface 21b of the diffusion sheet 43 may be, e.g., a flat surface (mirror surface) or an embossed surface.

The diffusion sheet 43 may have a single layer structure consisting of the base material layer 21 with the first surface 21a having an uneven shape (recesses 22). The diffusion sheet 43 may have a double layer structure consisting of a base material layer having two flat surfaces and a layer having one uneven surface. The diffusion sheet 43 may have a triple or more layer structure including a layer having one uneven surface.

[Method for Manufacturing Diffusion Sheet]

The method for manufacturing the diffusion sheet 43 is not particularly limited. For example, extrusion molding, injection molding, or the like may be employed.

A single layer diffusion sheet having an uneven surface may be manufactured by extrusion molding as follows. First, plastic particles as pellets with a diffusing agent (and may be plastic particles as pellets without a diffusing agent together) are introduced into a single-screw extruder. Then, the plastic particles are heated, molten, and kneaded. After that, the molten resin extruded from a T-die is sandwiched and cooled between two metal rolls, then transported by guide rolls, and cut off into sheet plates by a sheet cutter machine to produce diffusion sheets. Here, the molten resin is sandwiched using the metal roll having a surface with an inverted shape of desired unevenness, which will be transferred onto the resin. This allows for shaping of diffusion sheets having surfaces with the desired unevenness. The surface shapes of the rolls are not perfectly transferred onto the resin, and thus may be designed in consideration of how completely the shapes are transferred.

If a two-layered diffusion sheet with uneven surfaces is manufactured by extrusion molding, for example, plastic particles as pellets necessary for forming each layer may be introduced into each of two single-screw extruders. Then, the same procedure may be performed for each layer, and the fabricated sheets may be layered.

Alternatively, the two-layered diffusion sheet with an uneven surface may be manufactured as follows. First, plastic particles as pellets necessary for forming each layer are introduced into each of two single-screw extruders, molten by heating, and kneaded. Then, molten resin formed into each layer is introduced into a single T-die so that molten resins are layered in the T-die. Then, the layered molten resins extruded from the T-die are sandwiched and cooled between two metal rolls. After that, the layered molten resins are transported by guide rolls, and cut off into sheet plates using a sheet cutter machine, thus yielding a two-layered diffusion sheet with an uneven surface.

Alternatively, the diffusion sheet may be manufactured by shape-transfer using ultraviolet (UV) as follows. First, an uncured ultraviolet curable resin is filled in a roll having an inverted shape of an uneven shape to be transferred, and a base material is pressed onto the resin. Next, with the roll filled with UV-curing resin and the base material in one piece, the resin is cured by UV irradiation. Next, the sheet to which the uneven shape has been transferred by using the resin is released from the roll. Finally, the sheet is irradiated with ultraviolet rays again to completely cure the resin, thereby producing a diffusion sheet having an uneven surface.

In the present disclosure, the term "substantially inverted quadrangular pyramid" is used in consideration of difficulty in formation of a recess having a geometrically exact inverted quadrangular pyramid shape by an ordinary shape transfer technique. However, the "substantially inverted quadrangular pyramid" encompasses shapes that can be regarded as a true or approximately inverted quadrangular pyramid. Further, "substantial(ly)" XX means that shapes can be approximated to the XX, and "substantially inverted quadrangular pyramids" means shapes that can be approximated to the inverted quadrangular pyramids. For example, the "substantially inverted quadrangular pyramid" includes an "inverted truncated quadrangular pyramid" which has a flat apex and of which the area of the apex is so small that the advantages of the present invention are not lost. The "substantially inverted quadrangular pyramid" also includes a deformation of "inverted quadrangular pyramid" with unavoidable shape variations due to the processing accuracy of industrial production.

[Prism Sheet]

The prism sheets 44 and 45, through which the light rays need to pass, are formed mainly of a transparent (e.g., colorless and transparent) synthetic resin. The prism sheets 44 and 45 may be formed as one piece. As shown in FIG. 2, the lower prism sheet 44 includes a base material layer 44a and an array of a plurality of prism projections 44b stacked on the surface of the base material layer 44a. Similarly, the upper prism sheet 45 includes a base material layer 45a and an array of a plurality of prism projections 45b stacked on the surface of the base material layer 45a. The prism projections 44b and 45b are stacked in a stripe pattern on the surfaces of the base material layers 44a and 45a, respectively. The prism projections 44b and 45b are triangular prisms and have back surfaces that are in contact with the surfaces of the base material layers 44a and 45a, respectively. The extending direction of the prism projections 44b and the extending direction of the prism projections 45b are perpendicular to each other. Accordingly, light rays incident from the diffusion sheet 43 can be refracted in the normal direction by the lower prism sheet 44, and light rays emitted from the lower prism sheet 44 can be further refracted by the upper prism sheet 45 in a direction substantially perpendicular to the display screen 50a.

The lower limit of the thickness of the prism sheets 44 and 45 (the height from the back surface of the base material layer 44a and 45a to the apex of the prism projections 44b and 45b) may be, e.g., approximately 50 μm, and more preferably approximately 100 μm. The upper limit of the thickness of the prism sheets 44 and 45 may be, e.g., approximately 200 μm, and more preferably approximately 180 μm. The lower limit of the pitch of the prism projections 44b and 45b in the prism sheets 44 and 45 may be, e.g., approximately 20 μm, and more preferably approximately 25 μm. The upper limit of the pitch of the prism projections 44b and 45b in the prism sheets 44 and 45 may be, e.g., approximately 100 μm, and more preferably approximately 60 μm. The apex angle of the prism projections 44b and 45b may be, e.g., 85° or more and 95° or less. The lower limit of the refractive index of the prism projections 44b and 45b may be, e.g., 1.5, and more preferably 1.55. The upper limit of the refractive index of the prism projections 44b and 45b may be, e.g., 1.7.

The prism sheets 44 and 45 may include the base material layers 44a and 45a and the prism projections 44b and 45b, where the prism projections 44b and 45b to which the shape transfer is applied by using an UV curable acryl-based resin are provided on the base material layers 44a and 45a made of, e.g., a PET (polyethylene terephthalate) film, or where the prism projections 44b and 45b are formed as one piece with the base material layers 44a and 45a, respectively.

[Other Optical Sheets]

Although not shown, a polarizing sheet may be provided above the prism sheets 44 and 45 (i.e., on the side closer to the display screen 50a). The polarizing sheet improves the luminance of the display screen 50a by keeping light emitted from the backlight unit 40 from being absorbed into the first polarizing plate 6 of the liquid crystal display device 50.

Features of Embodiment

The optical sheet laminate 100 of this embodiment is incorporated into the backlight unit 40. The optical sheet laminate 100 includes the plurality of diffusion sheets 43 each having the first surface 21a provided with the plurality of recesses 22 having a substantially inverted quadrangular pyramid shape and arranged in a two-dimensional matrix, and the pair of prism sheets 44 and 45 having the prism projections 44b and 45b having the extending directions (hereinafter referred to as prism extending directions in some cases) perpendicular to each other.

When the plurality of the diffusion sheets 43, which are pyramid sheets, are used in a layered manner, the arrangement directions of the recesses 22 of the diffusion sheets 43 are preferably set to the same direction in order to reduce the loss of cutting from a sheet roll at the time of formation of the diffusion sheets 43.

The inventor of the present application has studied and found that the luminance more increases when the angle difference between the arrangement direction of the recesses 22 of the diffusion sheets 43 and the prism extending direction of the prism sheets 44 and 45 is 20° or more and 70° or less, preferably 25° or more and 35° or less, or 55° or more and 65° or less, than when the angle difference is near 0° or near 90°. Note that the extending direction of the prism projections 44b and the extending direction of the prism projections 45b are perpendicular to each other, and thus if either one of the extending directions of the prism projection 44b or 45b satisfies the above angle difference, the other one of the extending directions of the prism projection 44b or 45b also satisfies the above angle difference.

However, the inventor of the present application has found that, in some cases, the luminance increases but the luminance uniformity decreases when the plurality of diffusion sheets 43 each include the recesses 22 having the same arrangement direction so that the angle difference between the arrangement direction of the recesses 22 and the prism extending direction is within the above range.

Then, the inventor of the present application has evaluated the luminance uniformity by changing the arrangement directions of the recesses 22 of each of the plurality of diffusion sheets 43, and found that the plurality of diffusion sheets 43 where the arrangement direction of the recesses 22 of one of the diffusion sheets 43 is different from that of another one of the diffusion sheets 43 enables the luminance uniformity to decrease in some cases.

That is, the optical sheet laminate 100 of this embodiment is based on the above findings, and the plurality of diffusion sheets 43 include at least two diffusion sheets 43 where the arrangement direction of the recesses 22 of one of the at least two diffusion sheets 43 is different from that of another one of the at least two diffusion sheets 43.

The optical sheet laminate 100 of this embodiment described above uses the plurality of diffusion sheets 43 each including a first surface 21a having a plurality of recesses 22 having a substantially inverted quadrangular pyramid shape and arranged in a two-dimensional matrix, such that light having traveled straight from the light sources 42 are repeatedly diffused. Thus, the luminance uniformity can be improved. Further, the at least two diffusion sheets 43 where the arrangement direction of the recesses 22 of one of the at least two diffusion sheets 43 is different from that of another one of the at least two diffusion sheets 43 enables further improvement in the luminance uniformity.

To further improve the luminance uniformity, it is preferable that the optical sheet laminate 100 of this embodiment includes the plurality of diffusion sheets 43 including a first diffusion sheet and a second diffusion sheet, where the arrangement direction of the recesses 22 of the second diffusion sheet is different by 10° or more from the arrangement direction of the recesses 22 of the first diffusion sheet. In this case, it is further preferable that the plurality of diffusion sheets 43 further include a third diffusion sheet, where the arrangement direction of the recesses 22 of the third diffusion sheet is different by 10° or more from the arrangement direction of the recesses 22 of each of the first diffusion sheet and the second diffusion sheet. Specifically, the arrangement directions of the recesses 22 of the plurality of diffusion sheets 43 may be different by about 10° to 45° from each other. Note that the recesses 22 are arranged in a two-dimensional matrix, and thus the angle difference between the arrangement directions of the recesses 22 of the two diffusion sheets 43 is 45° at the most.

Figure 5:
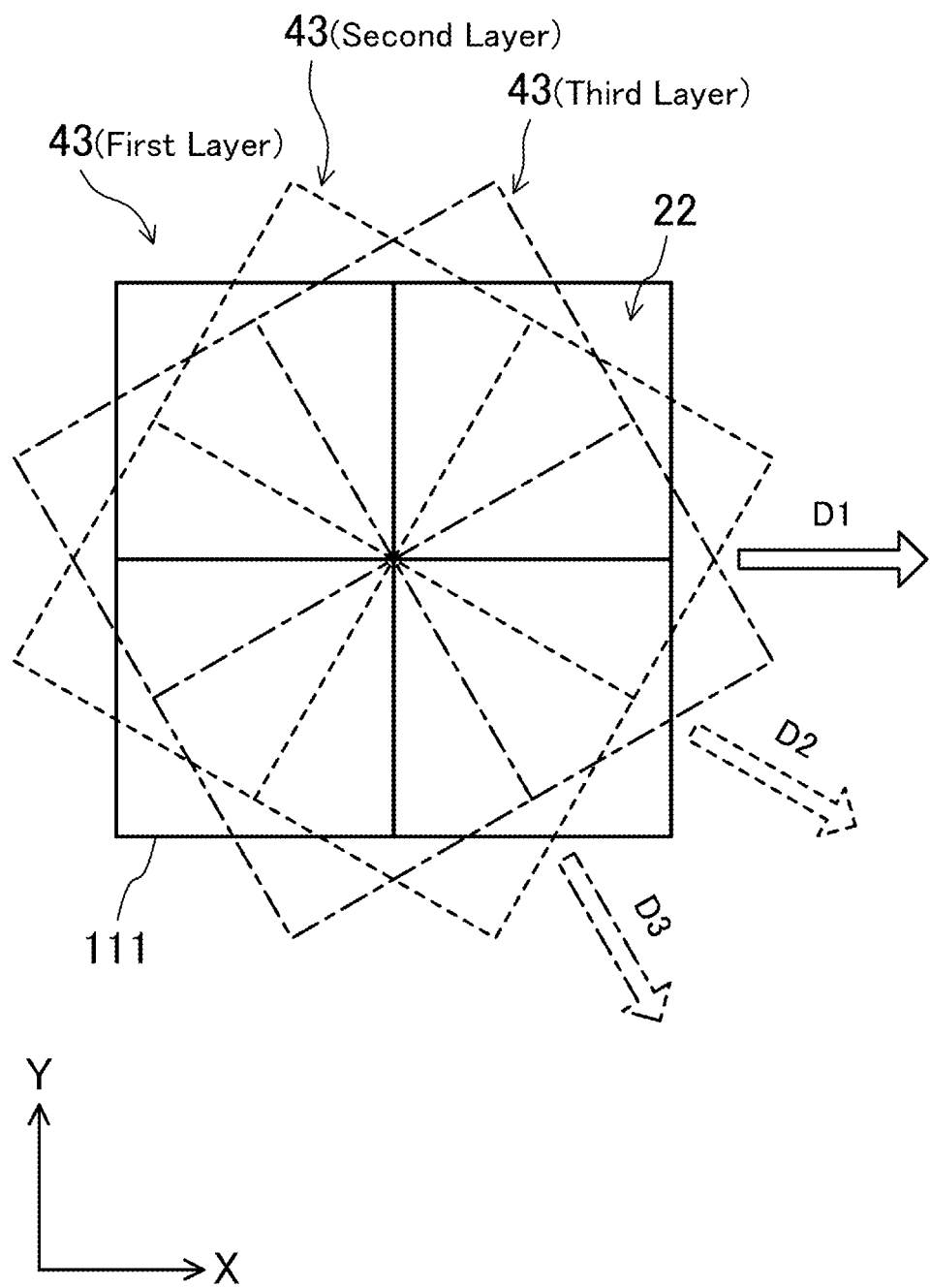
FIG. 5 shows an exemplary relationship among the arrangement directions of recesses of diffusion sheets in the optical sheet laminate of the embodiment.

FIG. 5 shows an exemplary relationship among the arrangement directions of recesses 22 of a plurality of (three) diffusion sheets 43 in the optical sheet laminate 100 of this embodiment. FIG. 5 shows that the recesses 22 of each of the diffusion sheets 43 are arranged in two rows and two columns, and the centers of the diffusion sheets 43 are put together. As shown in FIG. 5, the recesses 22 of the diffusion sheet 43 serving as the first layer (the diffusion sheet 43 closest to the light sources 42) are arranged along the X-axis and Y-axis perpendicular to each other. The arrangement direction parallel to the X-axis is referred to as an arrangement direction D1. In this case, an arrangement direction D2 of the recesses 22 of the diffusion sheet 43 serving as the second layer is different from the arrangement direction D1, and an arrangement direction D3 of the recesses 22 of the diffusion sheet 43 serving as the third layer is different from the arrangement directions D1 and D2.

FIG. 5 shows that the arrangement directions of the recesses 22 of the three diffusion sheets 43 are all different from one another. Alternatively, the arrangement directions of the recesses 22 of two of the three diffusion sheets 43 may be the same.

In the optical sheet laminate 100 of this embodiment, the arrangement direction of the recesses 22 of at least one of the plurality of diffusion sheets 43 may be different by 20° or more and 70° or less from the prism extending direction of the prism sheets 44 and 45. Accordingly, with the same light sources, the same electric power, and the same optical sheet laminate configuration, the luminance more increases than when the angle difference between the arrangement direction of the recesses 22 (inverted quadrangular pyramids) and the prism extending direction is near 0° or near 90°. Thus, the backlight unit 40 with even low power can provide a high-luminance screen. In this case, still higher luminance can be achieved when the intersecting angle between the arrangement direction of the recesses 22 and the prism extending direction is 25° or more and 35° or less, or 55° or more and 65° or less.

The backlight unit 40 of this embodiment is built in the liquid crystal display device 50 and leads light emitted from the light sources 42 toward the display screen 50a. The backlight unit 40 has the optical sheet laminate 100 of this embodiment between the display screen 50a and the light sources 42, and the plurality of diffusion sheets 43 are arranged between the light sources 42 and the prism sheets 44 and 45.

The backlight unit 40 of this embodiment includes the optical sheet laminate 100 of this embodiment, and this enables less decrease in the luminance uniformity.

In the backlight unit 40 of this embodiment, the light sources 42 may be arranged on the reflection sheet 41 provided on an opposite side of the display screen 50a when viewed from the plurality of diffusion sheets 43. This causes multiple reflections between the diffusion sheets 43 and the reflection sheet 41 thus causing further light diffusion, and thus the luminance uniformity is improved.

The backlight unit 40 of this embodiment can be downsized when the distance between the light sources 42 and the plurality of diffusion sheets 43 (to be precise, the distance between the light sources 42 and one of the diffusion sheets 43 closest to the light sources 42) is 5 mm or less. In anticipation of the future reduction in thicknesses of medium-to-small-sized liquid crystal displays, the distance between the light sources 42 and the plurality of diffusion sheets 43 may be preferably 2.5 mm or less, more preferably 1 mm or less, and ultimately 0 mm.

The liquid crystal display device 50 of this embodiment includes the backlight unit 40 of this embodiment and the liquid crystal display panel 5. Therefore, the optical sheet laminate 100 incorporated in the backlight unit 40 enables less decrease in the luminance uniformity. Information apparatuses (e.g., portable information equipment such as laptop computers, tablet computers, and the like) containing the liquid crystal display device 50 can also achieve the similar advantages.

A method of this embodiment for manufacturing a backlight unit 40 is a method for manufacturing a backlight unit 40 to be built in a liquid crystal display device 50 and leading light emitted from light sources 42 toward a display screen 50a. The method of this embodiment for manufacturing a backlight unit 40 includes arranging a plurality of diffusion sheets 43 between the light sources 42 and a display screen 50a, where the plurality of diffusion sheets 43 each include a first surface 21a having a plurality of recesses 22 having a substantially inverted quadrangular pyramid shape and arranged in a two-dimensional matrix; and arranging a pair of prism sheets 44 and 45 between the display screen 50a and the plurality of diffusion sheets 43, where the pair of prism sheets 44 and 45 have prism extending directions perpendicular to each other. In arranging the plurality of diffusion sheets 43, the luminance uniformity is evaluated with various arrangement directions of the recesses 22 of each diffusion sheet 43. Then, based on the evaluation result, the arrangement direction of the recesses 22 of each diffusion sheet 43 is determined.

The method of this embodiment for manufacturing a backlight unit 40 includes arranging the plurality of diffusion sheets 43, where the arrangement direction of the recesses 22 of each diffusion sheet 43 is determined based on the result obtained by evaluation of the luminance uniformity with various arrangement directions of the recesses 22 of each diffusion sheet 43. Therefore, the arrangement direction of the recesses 22 of each diffusion sheet 43 can be set to improve the luminance uniformity.

Example

An example will be described below.

In this example, an optical sheet laminate 100 was used which included three diffusion sheets 43 having a thickness of 110 μm, having the same structure, and layered in the same orientation; and a lower prism sheet 44 and an upper prism sheet 45 having prism extending directions perpendicular to each other, where the lower prism sheet 44 and the upper prism sheet 45 were arranged above the diffusion sheets 43.

The diffusion sheets 43 each having a single layer structure including a base material layer 21 were formed, where the base material layer 21 was formed by extrusion molding of polycarbonate, and the recesses 22 having an inverted pyramid shape with an apex angle of 90° and a depth of 50 μm were arranged two-dimensionally at a pitch of 100 μm. The diffusion sheet 43 was arranged so that the arrangement surface (first surface 21a) for the recesses 22 served as the light emitting surface, and the opposite surface (second surface 21b) of the arrangement surface (first surface 21a) for the recesses 22 was processed into a matte surface.

The prism sheets 44 and 45 included base material layers 44a and 45a made of a PET film and prism projections 44b and 45b, where the prism projections 44b and 45b were provided on the base material layers 44a and 45a by using an UV-curable acryl-based resin made from acrylate. The lower prism sheet 44 had a total thickness of 145 μm, and had the prism projections 44b having a height of 12 μm and an apex angle of 94° and arranged at a pitch of 25 μm. The upper prism sheet 45 had a total thickness of 128 μm, and had the prism projections 45b having a height of 24 μm and an apex angle of 93° and arranged at a pitch of 51 μm.

Light sources 42 were arranged below the optical sheet laminate 100 of this example (i.e., arranged closer to the diffusion sheets 43). The luminance uniformity of light having passed the optical sheet laminate 100 was evaluated with variation in the arrangement direction of the recesses 22 of each diffusion sheet 43.

As the light sources 42, an white LED array was used which included blue LEDs with a peak wavelength of 456 nm (full width at half maximum: 19 nm), green LEDs with a peak wavelength of 535 nm (full width at half maximum: 53 nm), and red LEDs with a peak wavelength of 631 nm (full width at half maximum: 10 nm), which were alternately arranged two-dimensionally at a pitch of 8.4 mm.

Figure 6:
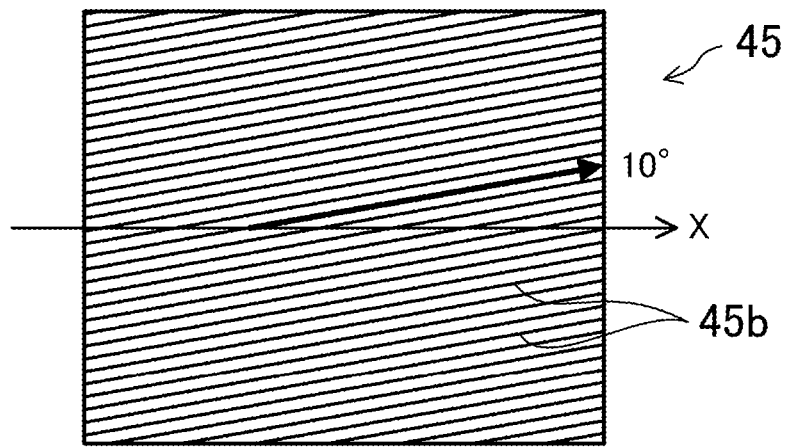
FIG. 6 is diagrams showing arrangement angles of the diffusion sheet and the prism sheets in the optical sheet laminate of the examples.
Figure 6:
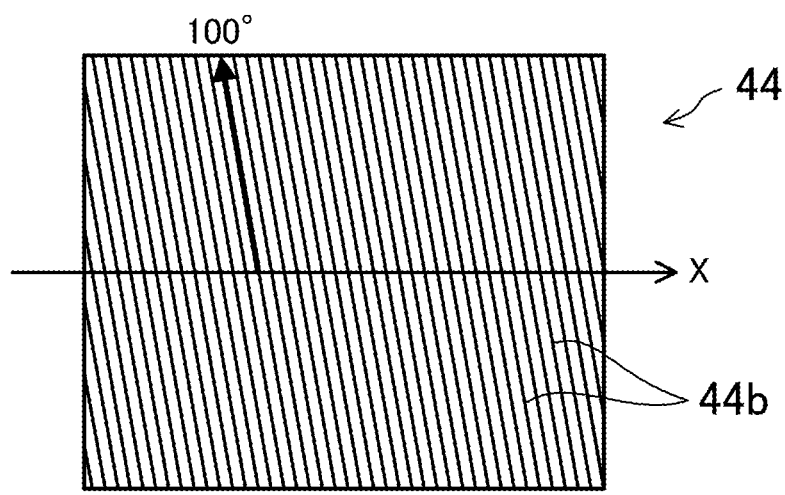
Figure 6:
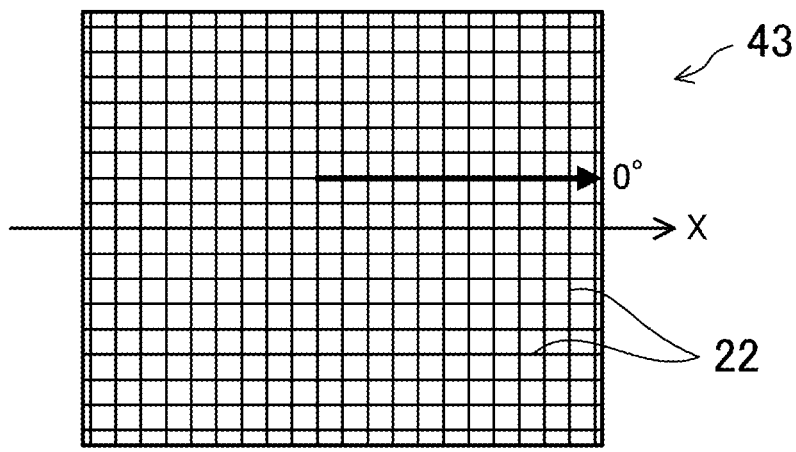

As shown in FIG. 6, in an initial state for evaluation of the luminance uniformity, the diffusion sheet 43 was arranged so that one of the arrangement directions of the recesses 22 coincided with a reference direction (X-axis direction) (i.e., arrangement angle of 0°); the lower prism sheet 44 was arranged so that the extending direction of the prism projections 44b was rotated counterclockwise by 100° on the X-axis (i.e., arrangement angle of 100°); and the upper prism sheet 45 was arranged so that the extending direction of the prism projections 45b was rotated counterclockwise by 10° on the X-axis (i.e., arrangement angle of 10°).

Then, the luminance uniformity was evaluated with variation in the arrangement angle (the angle formed counterclockwise by the arrangement direction of the recesses 22 with respect to the X-axis) of the three diffusion sheets (inverted pyramid sheets) 43 from the initial state.

As comparative examples, three different types of diffusion sheets 43 were prepared. Two diffusion sheets 43 of each of the three different types were layered so that the arrangement directions of the recesses 22 were the same. Then, the luminance uniformity was evaluated in the similar manner. As another example, for one of the three types of the diffusion sheets 43, the arrangement directions of the recesses 22 of the two diffusion sheets 43 were differentiated from each other by 45°.

Specifically, the luminance uniformity was evaluated as follows. First, the optical sheet laminate 100 of the example or the comparative example was arranged above the light sources 42 (LED array), and a transparent glass plate was placed thereabove to reduce floating of the sheets. Then, the two-dimensional color luminance meter UA-200 manufactured by Topcon Technohouse Corporation was used to measure the luminance in a range of 33 mm square in the vertically upward direction (i.e., in the direction from the LED array towards the glass plate). Then, for two-dimensional luminance distribution images obtained, variation in the light emitting intensity of individual LEDs was corrected and filtering process was conducted to reduce bright/dark spot noise attributed to foreign materials and the like. Then, average and standard deviation were calculated for the luminance of all the pixels. Finally, the luminance uniformity was evaluated with the definition of "luminance uniformity=average/standard deviation".

Figure 7:
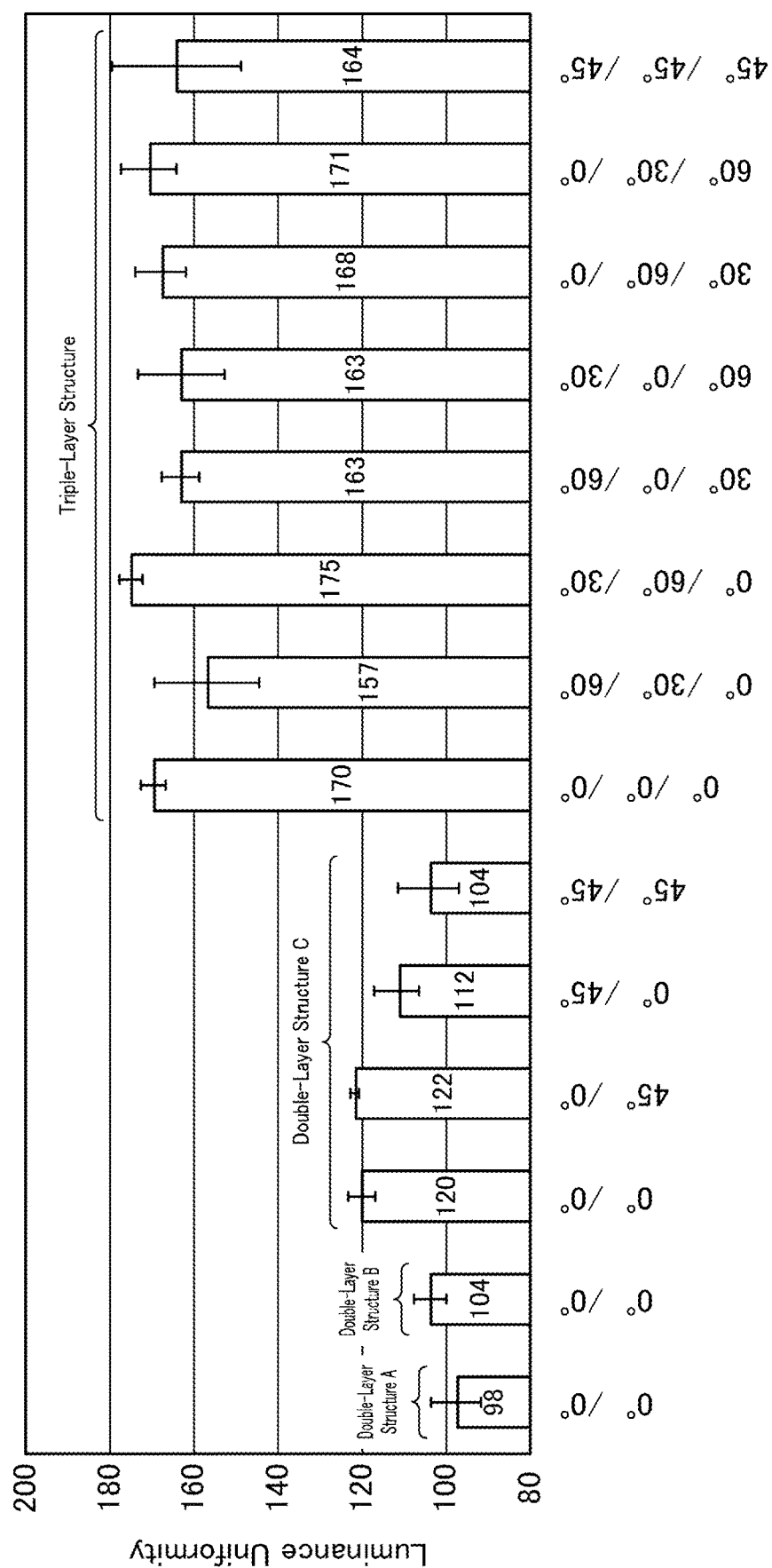
FIG. 7 shows a relationship between the arrangement direction of recesses of each diffusion sheet in the optical sheet laminate of the examples and the luminance uniformity.

The results of the evaluation of the luminance uniformity described above are shown in FIG. 7. FIG. 7 shows the relationship between the arrangement direction of recesses 22 of each diffusion sheet 43 and the luminance uniformity in the optical sheet laminate 100 of the example. In FIG. 7, the angles on the horizontal axis represent "the arrangement angle of the diffusion sheet closer to the light sources"/"the arrangement angle of the diffusion sheet closer to the prism sheet" for the diffusion sheets 43 having a double-layer structure, and "the arrangement angle of the diffusion sheet closest to the light sources"/"the arrangement angle of the middle diffusion sheet"/"the arrangement angle of the diffusion sheet closest to the prism sheet" for the diffusion sheets 43 having a triple-layer structure.

As shown in FIG. 7, for the diffusion sheets 43 having a triple-layer structure, the luminance uniformity equivalent to that at 0°/0°/0° was achieved at 0°/60°/30°, 30°/60/0°, and 60°/30°/0°. In the other cases, the luminance uniformity did not decrease by more than 10% as compared to 0°/0°/0°. On the other hand, in the example, the diffusion sheet 43 having a large arrangement angle provides the luminance increasing effect attributed to the angle difference from the prism extending direction as described above. Therefore, the example was better than that at 0°/0°/0°. For the diffusion sheets 43 having a double-layer structure (double-layer structures C in FIG. 7), the luminance uniformity equivalent to one at 0°/0° was achieved at, e.g., 45°/0° and 0°/45°, and thus better than at 0°/0° in consideration of the luminance increasing effect.

OTHER EMBODIMENTS

In the above embodiment (including the example: the same applies to the description below), the optical sheet laminate 100 includes the plurality of diffusion sheets 43 and the prism sheets 44 and 45. Alternatively, the optical sheet laminate 100 may further include other optical sheets.

In the above embodiment, the inverted polygonal pyramid shape of the recesses 22 on the first surface 21a of the diffusion sheet 43 in the optical sheet laminate 100 is an inverted quadrangular pyramid. Alternatively, the inverted polygonal pyramid shape may be other shapes that can be arranged two-dimensionally, such as an inverted triangular shape or an inverted hexagonal shape. Alternatively, an array of projections such as prism projections and the like may be provided in place of the recesses 22 that can be arranged two-dimensionally. The second surface 21b of the diffusion sheet 43 is either a flat surface (mirror surface) or an embossed surface. Alternatively, the second surface 21b of the diffusion sheet 43 may be provided with recesses having an inverted polygonal pyramid shape and capable of being arranged two-dimensionally, or an array of projections such as prism projections.

The above describes the embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:

1. An optical sheet laminate to be incorporated into a backlight unit, comprising:
   a plurality of diffusion sheets each comprising surfaces, at least one of which has a plurality of recesses comprising a substantially inverted quadrangular pyramid shape and arranged in a two-dimensional matrix; and
   a pair of prism sheets comprising prism extending directions perpendicular to each other,
   wherein
   the plurality of diffusion sheets include at least two diffusion sheets where an arrangement direction of the plurality of recesses of one of the at least two diffusion sheets is different from that of the plurality of recesses of another one of the at least two diffusion sheets.

2. The optical sheet laminate of claim 1, wherein
   the plurality of diffusion sheets include a first diffusion sheet and a second diffusion sheet, and
   an arrangement direction of the plurality of recesses of the second diffusion sheet is different by 10° or more from that of the plurality of recesses of the first diffusion sheet.

3. The optical sheet laminate of claim 2, wherein
   the plurality of diffusion sheets further include a third diffusion sheet, and
   an arrangement direction of the plurality of recesses of the third diffusion sheet is different by 10° or more from that of the plurality of recesses of each of the first diffusion sheet and the second diffusion sheet.

4. The optical sheet laminate of claim 1, wherein
   the arrangement direction of the plurality of recesses of at least one of the plurality of diffusion sheets is different by 20° or more and 70° or less from the prism extending direction.

5. A backlight unit to be built in a liquid crystal display device and leading light emitted from light sources toward a display screen, comprising:
   the optical sheet laminate of claim 1 between the display screen and the light sources, wherein
   the plurality of diffusion sheets are arranged between the light sources and the pair of prism sheets.

6. The backlight unit of claim 5, wherein
   the light sources are arranged on a reflection sheet provided on an opposite side of the display screen when viewed from the plurality of diffusion sheets.

7. The backlight unit of claim 5, wherein
   a distance between the light sources and the plurality of diffusion sheets is 5 mm or less.

8. A liquid crystal display device, comprising:
   the backlight unit of claim 5; and
   a liquid crystal display panel.

9. An information apparatus comprising: the liquid crystal display device of claim 8.

10. A method for manufacturing a backlight unit to be built in a liquid crystal display device and leading light emitted from light sources toward a display screen, the method comprising:
- arranging a plurality of diffusion sheets between the light sources and the display screen, where the plurality of diffusion sheets each comprise surfaces, at least one of which has a plurality of recesses comprising a substantially inverted quadrangular pyramid shape and arranged in a two-dimensional matrix; and
- arranging a pair of prism sheets between the plurality of diffusion sheets and the display screen, where the pair of prism sheets comprise prism extending directions perpendicular to each other, wherein
- in arranging the plurality of diffusion sheets, luminance uniformity is evaluated with various arrangement directions of the plurality of recesses of each of the plurality of diffusion sheets, and based on an evaluation result, the arrangement direction of the plurality of recesses of each of the plurality of diffusion sheets is determined.

\* \* \* \* \*